(12) United States Patent
Yamamoto (10) Patent No.: US 6,880,659 B2
(45) Date of Patent: Apr. 19, 2005

(54) COMPONENT ARRANGEMENT FOR SNOWMOBILE

(75) Inventor: Masanobu Yamamoto, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/648,024

(22) Filed: Aug. 26, 2003

(65) Prior Publication Data

US 2004/0040768 A1 Mar. 4, 2004

(30) Foreign Application Priority Data

Aug. 27, 2002 (JP) .......................... 2002-246408

(51) Int. Cl.⁷ ............................................ B62M 27/02
(52) U.S. Cl. ................................... 180/190; 123/192.2
(58) Field of Search ................................. 180/182, 191, 180/9.1, 9.62, 9.64, 53.8, 190; 74/589, 591; 123/192.2

(56) References Cited

U.S. PATENT DOCUMENTS

| | | | |
|---|---|---|---|
| 4,848,294 A | | 7/1989 | Yamamoto |
| 4,848,503 A | | 7/1989 | Yasui et al. |
| 5,014,812 A | | 5/1991 | Kazama |
| 5,957,230 A | | 9/1999 | Harano et al. |
| 6,006,715 A | * | 12/1999 | Izumi et al. ............. 123/192.2 |
| 6,032,754 A | * | 3/2000 | Izumi et al. ............. 180/190 |
| 2002/0000340 A1 | | 1/2002 | Laimbock |
| 2002/0027029 A1 | * | 3/2002 | Yatagai et al. ............ 180/182 |
| 2002/0100631 A1 | | 8/2002 | Nishijima |
| 2002/0148662 A1 | * | 10/2002 | Ashida et al. ............ 180/190 |
| 2004/0031635 A1 | * | 2/2004 | Pichler et al. ............ 180/190 |

FOREIGN PATENT DOCUMENTS

JP  05-229474  9/1993

OTHER PUBLICATIONS

European Search Report of European Patent Application EP 03 019297.

* cited by examiner

Primary Examiner—Tony Winner
(74) Attorney, Agent, or Firm—Knobbe, Martens, Olson & Bear, LLP (57) ABSTRACT

A snowmobile including a frame assembly and a drive assembly coupled to the frame assembly. The drive assembly including a drive belt adapted to contact a ground surface to propel the snowmobile over the ground surface. An engine is supported by the frame assembly and includes an engine body. The engine body includes a crankcase, a crankshaft rotatably journaled within the crankcase for rotation about a crankshaft axis, and a cylinder block assembly extending in an upward direction from the crankcase. The cylinder block assembly defines at least one cylinder bore adapted to support a piston for a reciprocal motion along a bore axis. A balancer shaft is rotatably coupled to the crankshaft and supported by the engine body for rotation about a balancer shaft axis. The cylinder assembly is canted such that the bore axis is inclined to rearwardly from a vertical axis and the balancer shaft axis is disposed above the crankshaft axis. At least a portion of the balancer shaft can be disposed directly above the crankshaft.

24 Claims, 7 Drawing Sheets

COMPONENT ARRANGEMENT FOR SNOWMOBILE

RELATED APPLICATION

This application is related to, and claims priority from, Japanese Patent Application No. 2002-246408, filed Aug. 27, 2002, the entirety of which is expressly incorporated by reference herein.

BACKGROUND OF THE INVENTION

1. Field of the Invention

The present invention relates generally to a snowmobile and, more particularly, to an improved component arrangement of a snowmobile.

2. Description of the Related Art

A conventional snowmobile includes an elongated body having a straddle-type seat extending along a rearward portion thereof to support an operator and one or more passengers of the snowmobile. A front end of the body is supported above the ground by one or more ski members and a rear end of the body is supported by a belt-type drive assembly. An engine is supported by the snowmobile body and is drivingly connected to the drive assembly to propel the snowmobile along the ground. In addition, suspension assemblies can be interposed between the body and the ski members and/or the drive assembly.

Increasingly, snowmobiles have utilized 4-cycle internal combustion engines in an effort to reduce emissions. The 4-cycle engine includes a crankcase rotatably supporting a crankshaft, an axis of which typically extends laterally, i.e., across the width of the vehicle. A cylinder assembly extends generally vertically from the crankshaft and defines one or more cylinder bores, each of which support a piston for reciprocation therein. Valve assemblies typically are positioned above the cylinder bores and are configured to selectively permit communication with combustion chambers defined in part by the cylinder bores and pistons.

In addition, the crankcase typically also supports a balancer shaft, which is coupled for rotation with the crankshaft and is adapted to offset an imbalance caused primarily by the movement of the one or more pistons. The inclusion of the valve assemblies and a balancer shaft results in the engine having a relatively large vertical dimension in comparison with a similar 2-cycle engine. As a result, the overall center of gravity tends to be higher when a 4-cycle engine is employed, in comparison to a snowmobile incorporating a 2-cycle engine. As is known by one of ordinary skill in the art, it is generally desirable to have a relatively low center of gravity in order to improve handling characteristics of the snowmobile.

Furthermore, the snowmobile typically is equipped with an intake system to deliver air and fuel to the engine and an exhaust system to evacuate exhaust gases from the engine. The intake system typically includes an air box defining a plenum chamber, which acts as an intake silencer. The air box also may be utilized to house an air cleaner element to filter air entering the engine through the intake system. In addition, a lubrication system to deliver lubricant to various moving parts of the engine and a cooling system to deliver a cooling fluid to the engine may also be provided. The snowmobile also includes a battery to provide electrical power to various components of the snowmobile, including the engine.

In order to maintain desirable dimensions of the snowmobile, the body provides a limited amount of space to accommodate all of the above-described components typical of a snowmobile employing a 4-cycle engine. Most prior snowmobile component arrangements have resulted in less than optimal handling characteristics. For example, prior component arrangements have resulted in the snowmobile having a center of gravity positioned too far forward and/or a center of gravity positioned too high relative to the body of the snowmobile, resulting in inadequate grip of the drive assembly with the ground surface and/or instability during turns or other lateral movements.

SUMMARY OF THE INVENTION

Accordingly, an improved snowmobile component layout providing improved stability and ride comfort of the snowmobile is provided by at least one of the inventions disclosed herein. Preferably, preferred embodiments of the present component arrangement lower the center of gravity of the snowmobile and provides improved traction of the drive assembly. In addition, preferably the component arrangement places the components of the snowmobile in a compact manner without impairing the function of the components.

One aspect of at least one of the inventions disclosed herein includes a snowmobile comprising a frame assembly. A drive assembly is coupled to the frame assembly and includes a drive belt adapted to contact a ground surface to propel the snowmobile over the ground surface. An engine is supported by the frame assembly and includes an engine body comprising a crankcase. A crankshaft is rotatably journaled within the crankcase for rotation about a crankshaft axis. A cylinder block assembly extends in an upward direction from the crankcase and defines at least one cylinder bore therein. The at least one cylinder bore is adapted to support a piston for a reciprocal motion along a bore axis. A balancer shaft is rotatably coupled to the crankshaft and supported by the engine body for rotation about a balancer shaft axis. The cylinder assembly is canted such that the bore axis is inclined rearwardly from a vertical axis and the balancer shaft axis is disposed above the crankshaft axis.

Another aspect of at least one of the inventions disclosed herein involves a snowmobile comprising a frame assembly. A drive assembly is coupled to the frame assembly and includes a drive belt adapted to contact a ground surface to propel the snowmobile over the ground surface. An engine is supported by the frame assembly and includes an engine body comprising a crankcase. A crankshaft is rotatably journaled within the crankcase for rotation about a crankshaft axis. A cylinder block assembly extends in an upward direction from the crankcase. The cylinder block assembly defines at least one cylinder bore therein adapted to support a piston for a reciprocal motion along a bore axis. A balancer shaft is rotatably coupled to the crankshaft and is supported by the engine body for rotation about a balancer shaft axis. The cylinder assembly is canted such that the bore axis is inclined rearwardly from a vertical axis and at least a portion of the balancer shaft is disposed directly above the crankshaft.

BRIEF DESCRIPTION OF THE DRAWINGS

These and other features, aspects and advantages of the present inventions are described in greater detail with reference to drawings of a preferred embodiment, which is intended to illustrate but not to limit the present inventions. The drawings contain seven figures.

DETAILED DESCRIPTION OF THE PREFERRED EMBODIMENT

Figure 1:
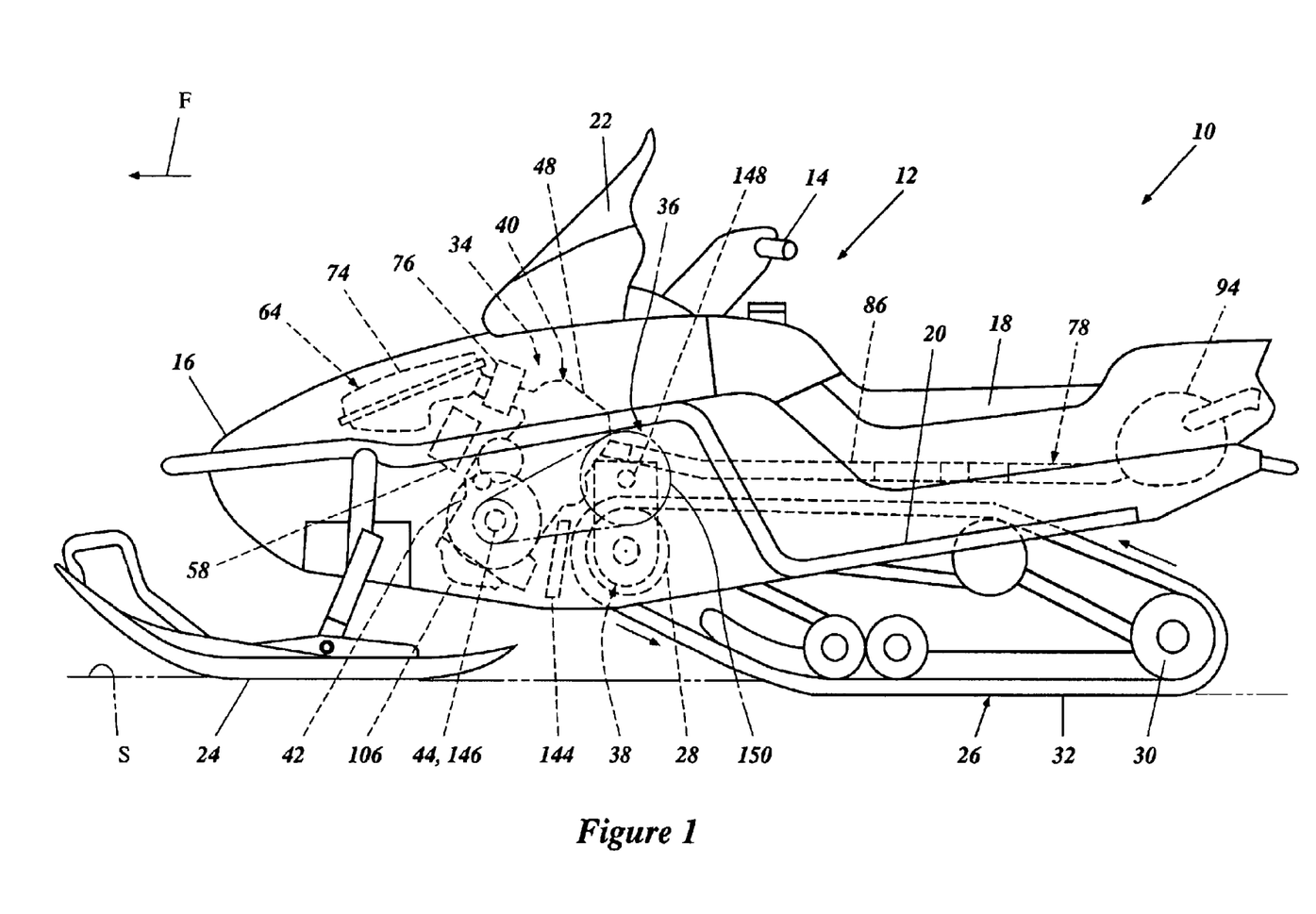
FIG. 1 is a side elevational view of a snowmobile including a preferred embodiment of the present component arrangement. Various components of the snowmobile, such as an engine, battery, air box, transmission, and exhaust system, are illustrated in phantom.

With reference to FIG. 1, a snowmobile incorporating a preferred embodiment of the present component arrangement is shown, and is generally referred to by the reference numeral 10. Although illustrated in connection with a snowmobile 10, the present component arrangement advantageously provides a compact engine arrangement, which can be adapted for utilization with other vehicles as well.

The snowmobile 10 is described in general detail in order to assist the reader's understanding of a preferred environment of use. The snowmobile 10 is described in relation to a coordinate system wherein a longitudinal axis extends along a length of the snowmobile 10. A vertical, central plane generally bisects the snowmobile 10 and contains the longitudinal axis. A lateral plane is oriented normal to the central plane. Relative heights are expressed as distances from a ground surface S upon which the snowmobile 10 operates. Right and left directions are given from the perspective of an operator sitting in a normal, forward-facing position on the snowmobile 10. In several figures, an arrow F indicates a direction of forward motion of the snowmobile 10.

The snowmobile 10 includes a main body 12, which supports a handlebar assembly 14 configured to permit an operator to steer the snowmobile 10 in a known manner. The body 12 also includes a main body portion 16, which includes a frame assembly and, preferably, body work members, such as protective covers or enclosures, for example.

A seat assembly 18 is supported by the main body 16 rearward of the handlebar assembly 14. The seat assembly 18 preferably is configured to support an operator and one or more passengers of the snowmobile 10 in a straddle-type fashion.

The vehicle main body 16 also includes a pair of foot rests 20 disposed on each side of the seat assembly 18 and adapted to support the feet of an operator and one or more passengers of the snowmobile 10. A cowling, or shield 22, is positioned to a forward side of the handlebar assembly 14 to deflect wind and/or other objects away from an operator and passengers of the snowmobile 10.

A pair of laterally-spaced ski members 24 support the main body 16 of the snowmobile 10 above a ground surface S, upon which the snowmobile 10 operates. The ski members 24 are movable with the handlebar assembly 14 to affect steering of the snowmobile 10 in a conventional manner. In addition, the ski members 24 can be supported relative to the main body 16 by a front suspension assembly (not shown) to absorb bumps, or other irregularities, of the ground surface S upon which the snowmobile 10 is operating.

A rearward end of the main body 16 is supported above the ground surface S by a drive assembly 26. The drive assembly 26 is adapted to propel the snowmobile 10 along the ground surface S. The illustrated drive assembly 26 includes a drive wheel 28, a follower wheel 30 and an endless drive belt 32 looped around the drive wheel 28 and the follower wheel 30. Thus, rotation of the drive wheel 28 results in rotation of the drive belt 32, which propels the snowmobile 10 along the ground surface S.

An internal combustion engine 34 is supported by the main body 16 and, preferably, is disposed forward of the seat assembly 18. An output of the engine 34 is configured to drive an input of a transmission assembly 36. An output of the transmission assembly 36 is adapted to drive the drive wheel 28 through a suitable drive coupler 38. The drive coupler 38 can be of any suitable construction to transmit motion between the output of the transmission assembly 36 and an input of the drive assembly 26.

Figure 3:
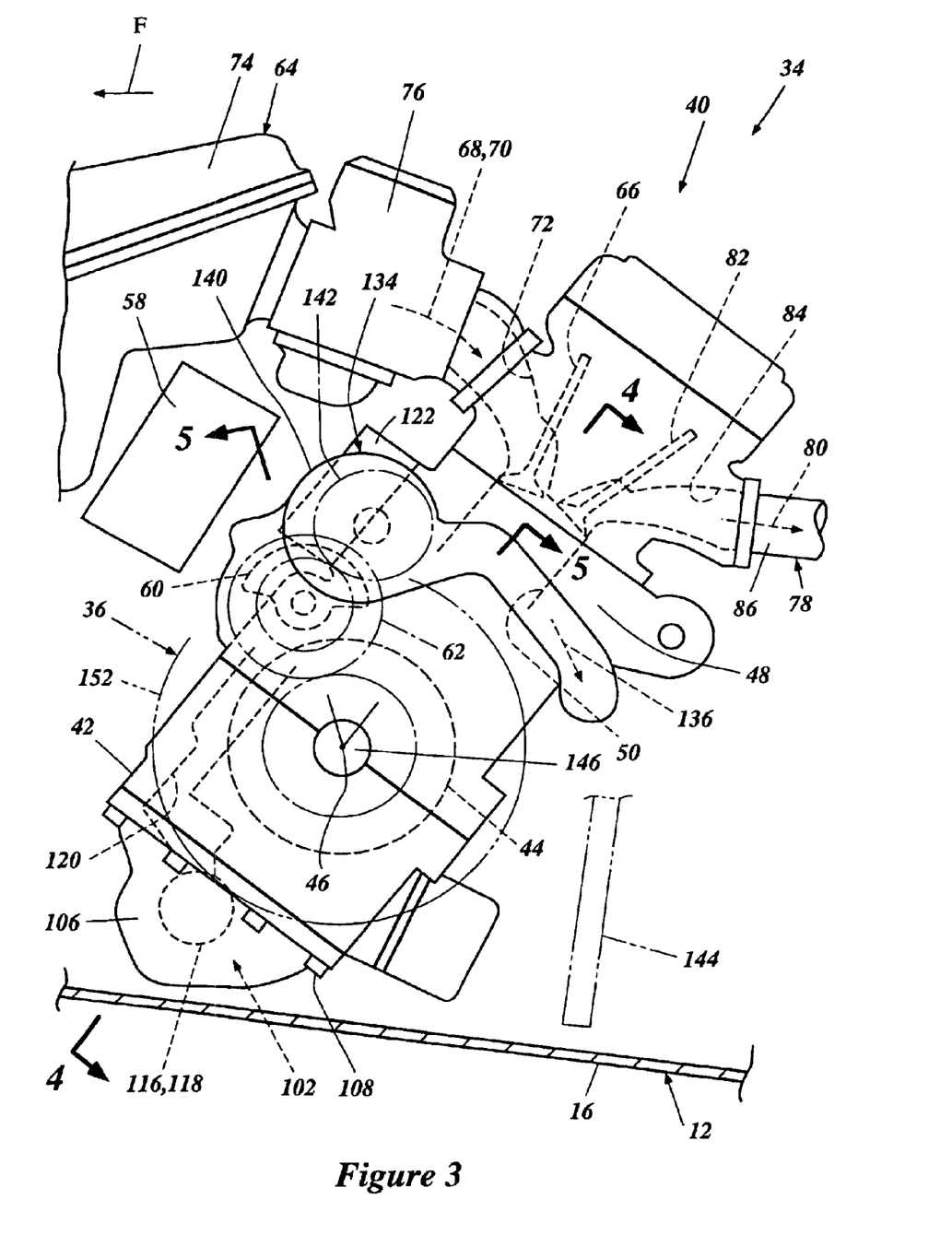
FIG. 3 is a left side view of the engine of the snowmobile of FIG. 1.
Figure 4:
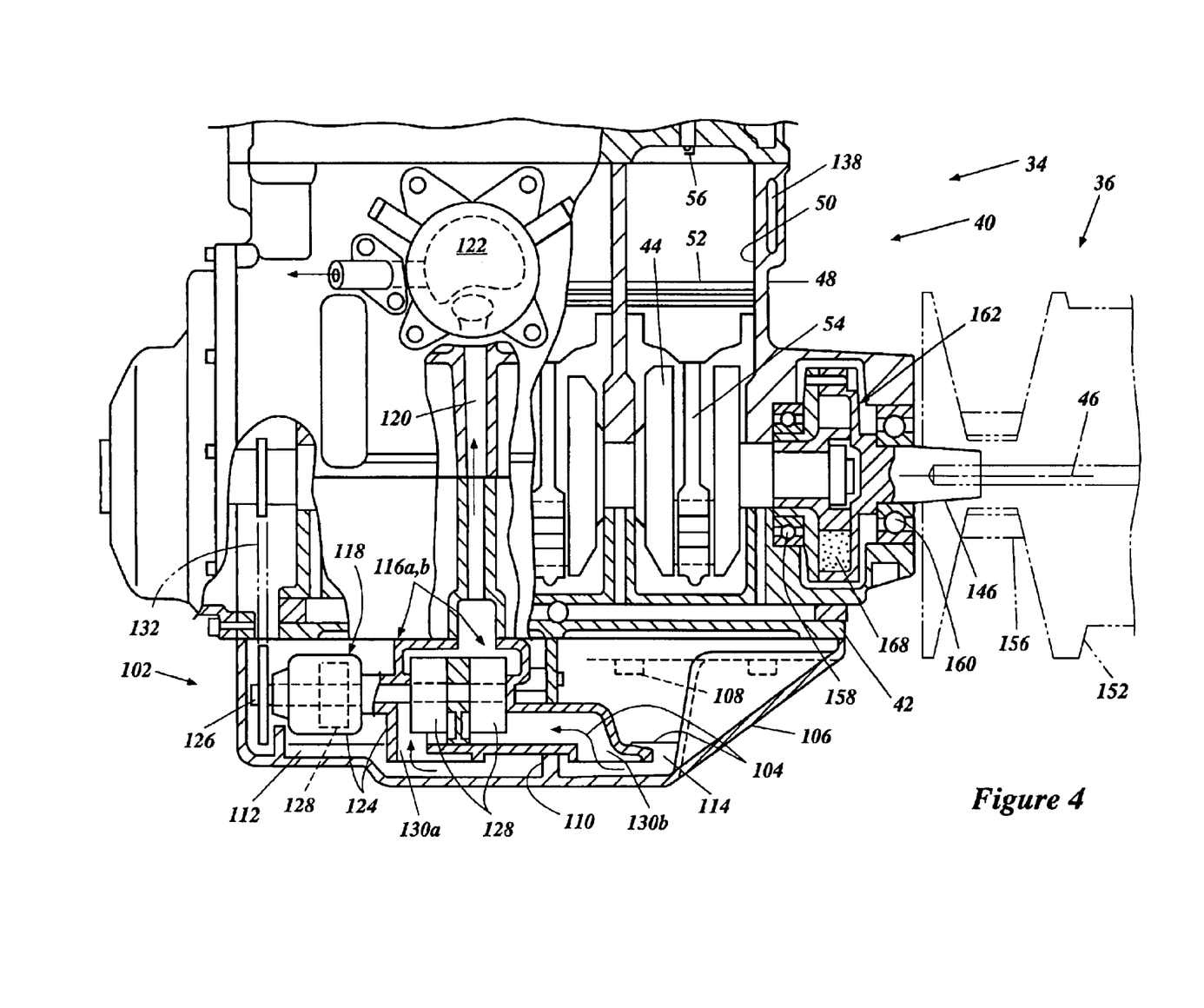
FIG. 4 is a partial cross-sectional view of the engine of FIG. 3, taken along view line 4—4 of FIG. 3. The transmission is shown in dashed lines.
Figure 5:
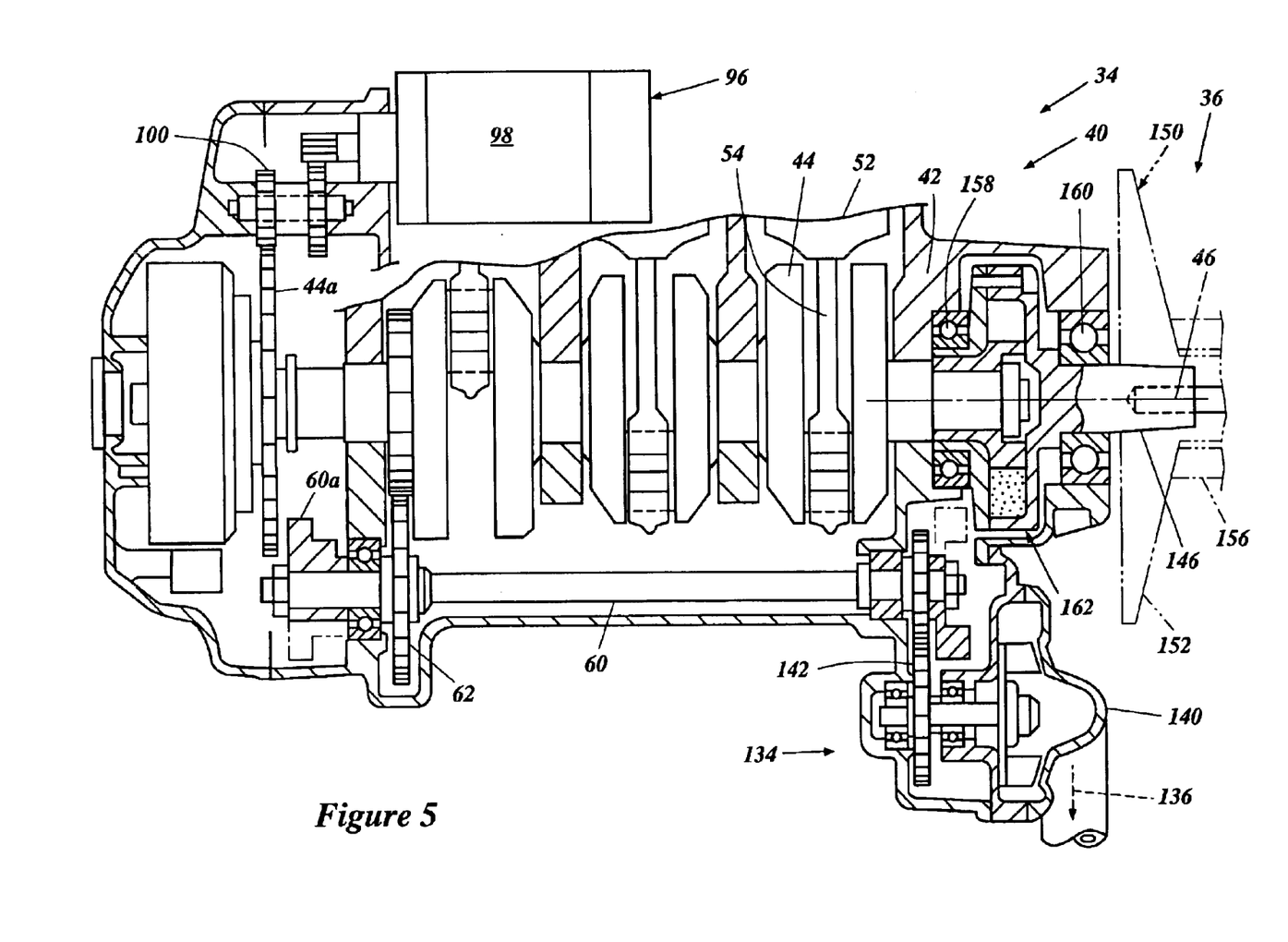
FIG. 5 is a cross-sectional view of the engine of FIG. 3, taken along view line 5—5 of FIG. 3.

With reference to FIGS. 1–5, the illustrated engine 34 is described in greater detail. The engine 34 includes an engine body 40. The engine body 40 includes a crankcase 42, which rotatably supports a crankshaft 44 for rotation about a crankshaft axis 46. The engine body 40 also includes a cylinder assembly 48, which defines one or more cylinder bores 50 therein. With reference to FIG. 5, preferably the engine 34 is a 3-cylinder engine and, thus, the cylinder assembly 48 defines three cylinder bores 50 therein. Preferably, each of the cylinder bores are constructed in a similar manner.

A piston 52 (FIG. 4) is supported for a reciprocation along an axis of each cylinder bore 50. The piston 52 is connected to the crankshaft 44 by a connecting rod 54. Thus, reciprocal motion of the piston 52 is converted to rotational motion of the crankshaft 44.

The piston 52 cooperates with the cylinder assembly 48 to define a combustion chamber of the engine 34. An electrode end of a spark plug 56 is positioned within the combustion chamber and is adapted to ignite a fuel charge within the combustion chamber in a conventional manner. A battery 58 supplies electrical power to the spark plug 56, among other components of the snowmobile 10.

With reference to FIGS. 3 and 5, the engine 34 also includes a balancer shaft 60. The balancer shaft 60 is drivingly coupled to the crankshaft 44 through any suitable arrangement. In the illustrated embodiment, the balancer shaft 60 is interlocked for rotation with the crankshaft 44 by a gear drive assembly 62. A weight 60a is carried by the balancer shaft 60 and is offset from an axis of the balancer shaft 60 to produce an imbalance force configured to substantially offset an imbalance force created by moving parts of the engine 34, such as the pistons 52 and connecting rods 54, for example.

Preferably, the engine body 40 is canted at a rearward angle, relative to a vertical axis, such that an axis of each cylinder bore 50 is canted rearwardly when the snowmobile 10 is supported on a generally level surface S. Thus, as oriented in the snowmobile 10, the engine 34 has a reduced vertical dimension compared to a vertically-oriented engine body.

In addition, preferably, an axis of the balancer shaft 60 is positioned above a horizontal plane passing through the crankshaft axis 46. In the illustrated arrangement, preferably at least a portion of the balancer shaft 60 is positioned directly above the crankshaft 44. That is, an imaginary vertical line is able to pass through both of the crankshaft 44 and the balancer shaft 60, as is apparent in FIG. 3. Furthermore, in the illustrated arrangement, an axis of the balancer shaft 60 is positioned forward from the crankshaft axis 46. As apparent from FIG. 3, the illustrated balancer shaft 60 is supported for rotation by the cylinder assembly 48, as opposed to being supported by the crankcase 42, as in prior snowmobile engine arrangements.

Advantageously, by positioning the balancer shaft 60 above and, preferably, forward of the crankshaft 44, the engine 34 is provided with a reduced vertical dimension relative to a prior snowmobile engines. Additionally, when combined with the above-described orientation of the engine body 40, wherein the axis of the cylinder bore(s) 50 are canted at a rearward angle relative to a vertical axis, the snowmobile 10 is provided with a low overall center of gravity. Furthermore, the rearwardly-canted engine body 40 tends to move the center of gravity of the snowmobile 10 in a rearward direction to provide the drive assembly 26 with additional traction.

Figure 2:
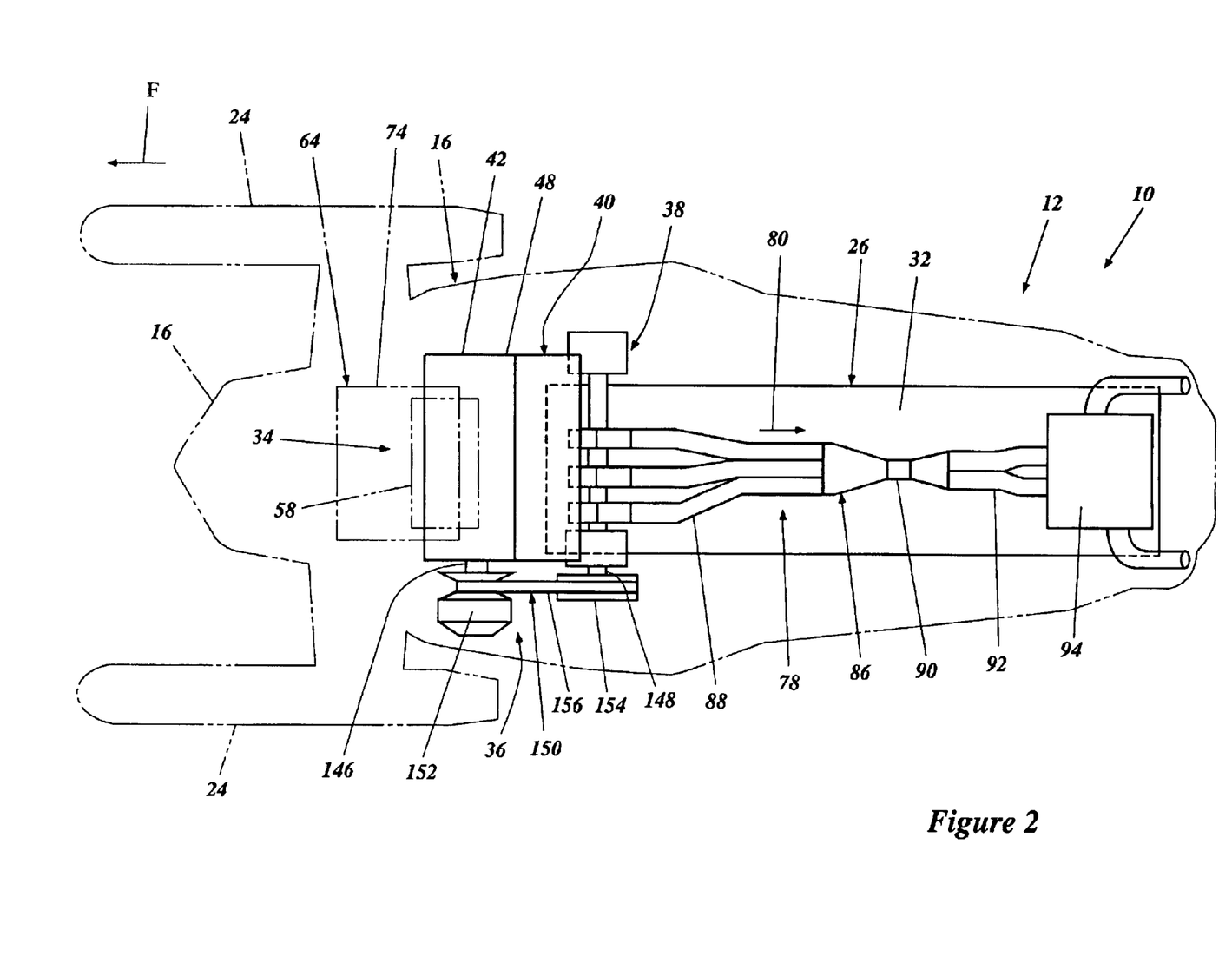
FIG. 2 is a top plan view of the snowmobile of FIG. 1. A portion of the snowmobile is shown in dashed lines.

With reference to FIGS. 1–3, an intake system 64 of the snowmobile 10 is described. The intake system 64 includes an intake valve 66, which is adapted to selectively permit atmospheric air 68 and fuel 70 to enter the associated combustion chamber through an intake path 72 defined, in part, by the cylinder assembly 48 (FIG. 3).

The intake system 64 also includes an air box 74, which defines a plenum chamber therein, and a carburetor 76. The carburetor 76 is positioned between the air box 74 and the cylinder assembly 48 and also defines a portion (not shown) of the intake passage 72. The carburetor 76 is adapted to deliver fuel 70 to the atmospheric air 68 passing through the carburetor 76.

The plenum chamber of the air box 74 provides a relatively large volume of still air for delivery to the combustion chambers of the engine 34 when the intake valve 66 is open. The air box 74 also acts as an intake air silencer to attenuate noise of intake air entering the engine 34. In addition, the air box 74 can include an air filter element (not shown) adapted to filter impurities from the atmospheric air 68 passing therethrough.

Due to the rearward cant of the cylinder assembly 48, a relatively open space is provided on a forward side of the cylinder assembly 48. Preferably, the air box 74 is positioned in the space forward of the cylinder assembly 48. In addition, at least a portion of the air box 74 is relatively higher than the cylinder assembly 48. With such an arrangement, the volume of the plenum chamber within the air box 74 can be made relatively large, which is beneficial to the power output of the engine 34.

The snowmobile 10 also includes an exhaust system 78 adapted to guide a combustion product, or exhaust gases 80, from the combustion chambers of the engine 34 to the atmosphere. The exhaust system 78 includes an exhaust valve 82, which selectively permits communication between the associated combustion chamber and an exhaust path 84 defined at least partially by the cylinder assembly 48.

An exhaust pipe 86 guides the exhaust gases 80 from the exhaust path 84 to the atmosphere. With reference to FIG. 2, the exhaust pipe 86 includes an exhaust header assembly 88 connected to, and extending from, the cylinder assembly 48. As illustrated, preferably the header assembly 88 includes a single conduit, or pipe, associated with each of the cylinder bores 50 of the engine 34. A rearward end of the exhaust headers 88 connect to a unitary exhaust conduit, or unitary pipe 90. A rear exhaust pipe 92 connects the unitary exhaust pipe 90 to a muffler assembly 94. As illustrated, preferably the rear exhaust pipe 92 includes a pair of pipe members.

The snowmobile 10 also includes a starter system 96 to permit starting of the engine 34. The starter system 96 includes a starter motor 98 configured to drive a starter gear 100. The starter gear 100, in turn, drives a gear 44a coupled to the crankshaft 44. When the starter motor 98 is activated, the starter gear 100 is rotated which, through the crankshaft gear 44a, rotates the crankshaft 44 and starts the engine 34. The starter motor 98 can be controlled by a suitable operator control, such as a starter switch (not shown).

With reference to FIG. 4, the snowmobile 10 also includes a lubrication system 102 adapted to deliver a lubricant 104 to various moving parts of the engine 34. The lubrication system 102 includes a lid member 106 coupled to a lower end of the crankcase 42 by one or more fasteners, such as bolts 108. Preferably, the lid member 106 is a shallow, pan-type member configured to define a space between the lower end of the crankcase 42 and an interior surface of the lid member 106. An interior wall 110 extends in an upward direction from the interior surface of the lid member 106 to divide the interior space between the lid member 106 and the crankcase 42 into a first chamber 112 and a second chamber 114. Lubricant 104 is permitted to move between the chambers 112, 114 by flowing over, or alternatively through, the wall 110.

The illustrated lubrication system 102 further includes a first scavenge pump 116a, a second scavenge pump 116b and a supply pump 118. The scavenge pumps 116a, 116b are configured to supply lubricant to a lubricant path 120 defined by the engine body 40. The lubricant path 120 leads from the interior space between the lid member 106 and the crankcase 42 to a lubricant cooler assembly 122, preferably coupled to a side of the cylinder assembly 48. The lubricant cooler assembly 122 is configured to cool the lubricant passing therethrough by bringing the lubricant into thermal communication with a cooling system of the snowmobile 10, which is described in greater detail below. From the lubricant cooler assembly 122, lubricant is directed toward a lubricant reservoir (not shown) where it is distributed to moving parts of the engine 34.

The lubricant pumps 116a, 116b, 118 include a lubricant pump casing 124, preferably supported from a lower end of the crankcase 42. A pump shaft 126 extends through the pump casing 124 and is supported for rotation relative to the casing 124. Each pump 116a, 116b, 118 includes a rotor 128, each of which are coupled for rotation with a pump shaft 126. Preferably, the casing 124 is divided into a first compartment housing the rotors 128 of the scavenge pumps 116a, 116b and a second chamber housing the rotor 128 of the supply pump 118.

The illustrated casing 124 defines a first lubricant inlet 130a communicating the first chamber 112 and a second inlet 130b communicating with a second chamber 114. The first and second inlets 130a, 130b guide lubricant to the first and second scavenge pumps 116a, 116b, respectively.

Each of the lubricant pumps 116a, 116b, 118 preferably are driven by the crankshaft 44. In the illustrated arrangement, a drive chain 132 extends between the crankshaft 44 and the pump shaft 126 to drive the shaft 126 along with the crankshaft 144.

In operation, the scavenge pumps 116a, 116b pump lubricant from the first and second chambers 112, 114 to the lubricant cooler assembly 122 through the path 120. The lubricant flows from the lubricant cooler assembly 122 to the lubricant reservoir (not shown) where the lubricant is available for distribution to moving parts of the engine 34. The supply pump 118 draws lubricant from the lubricant reservoir to moving parts of the engine, such as the valves 66, 82 and the crankshaft 44, before returning the lubricant to the first chamber 112. The lubricant 112 in the first chamber flows to the second chamber 114, as described above, to be available to the second scavenge pump 116b, through the second inlet 130b, for redistribution to the lubricant reservoir. As such, the lubrication system 102 operates according to the dry-sump principle of operation. However, the lubrication system 102 can be configured to operate in accordance with other principles, including the wet-sump principle of operation.

With reference to FIGS. 3–5, a cooling system 134 of the snowmobile 10 is described. The cooling system 134 is configured to supply a cooling liquid, or coolant 136, to various parts of the engine body 40, including one or more water jackets 138 (FIG. 4) defined by the engine body 40. The water jackets 138 are in thermal communication with a heat-producing portion of the engine 34.

The cooling system 134 includes a coolant pump 140, which is configured to deliver the coolant 136 to various parts of the engine body 40, including the water jacket 138. Preferably, the water pump 140 is driven by the balancer shaft 60 through a suitable drive arrangement, such as gear drive 142 in the illustrated embodiment. With reference to FIG. 3, preferably, the water pump 140 is positioned above the balancer shaft 60 and is at least partially supported by the cylinder assembly 48.

The cooling system 134 also includes a heat exchanger 144 (FIG. 3). The heat exchanger 144 is configured receive a flow of coolant 136 that has passed through the illustrated water jacket 138 and other heat-producing parts of the engine body 40. The coolant 136 collects heat energy from the heat-producing parts of the engine body 40 and releases the heat energy when passing through the heat exchanger 144. The coolant 136 then is re-circulated through the engine body 40.

With reference to FIGS. 1, 2, 6 and 7, the transmission 36 is described in greater detail. As described above, the transmission 36 is configured to deliver torque produced by the engine 34 to the drive assembly 26. The illustrated transmission 36 includes an input shaft 146 and output shaft 148. The input shaft 146 is drivingly coupled to the output shaft 148 through a continuously variable belt transmission assembly 150.

The continuously variable belt transmission assembly 150 includes a drive pulley assembly 152 and a follower pulley assembly 154 drivingly coupled by a transmission belt 156. Preferably, the drive pulley 152 is of a configuration wherein the effective diameter of the pulley 152 increases as the speed of the engine 34 is increased. As the effective diameter of the drive pulley 152 increases, the diameter of the follower pulley 154 is decreased due to the transmission belt 156 having a fixed length. Accordingly, the output ratio of the transmission assembly 36 is continuously varied with changes in the rotational speed of the drive pulley 152, which is coupled to the crankshaft 44 of the engine 34 through the input shaft 146 of the transmission 36. The output shaft 148 of the transmission 36 is drivingly coupled to the drive assembly 26 through the drive connection 38, as described above in relation to FIG. 1.

Figure 6:
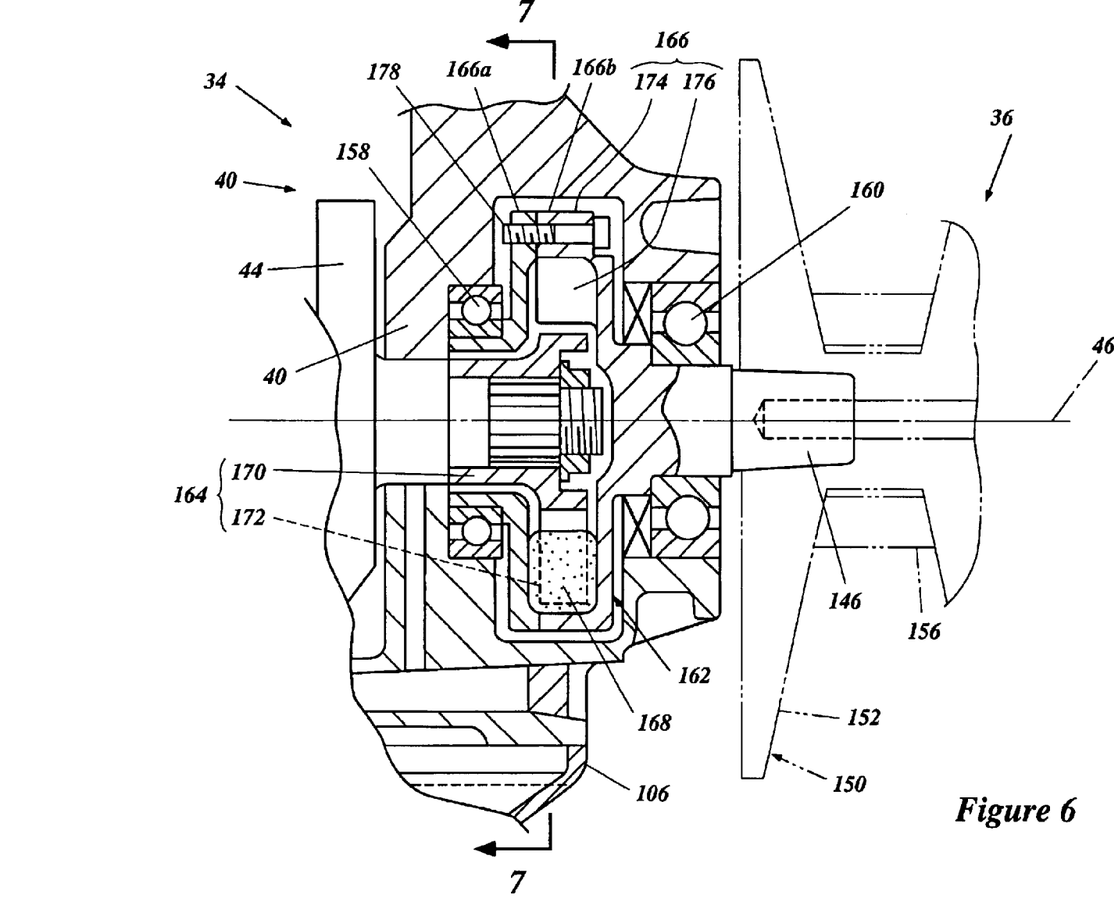
FIG. 6 is an enlarged view of an input shaft assembly of the transmission of FIG. 1.
Figure 7:
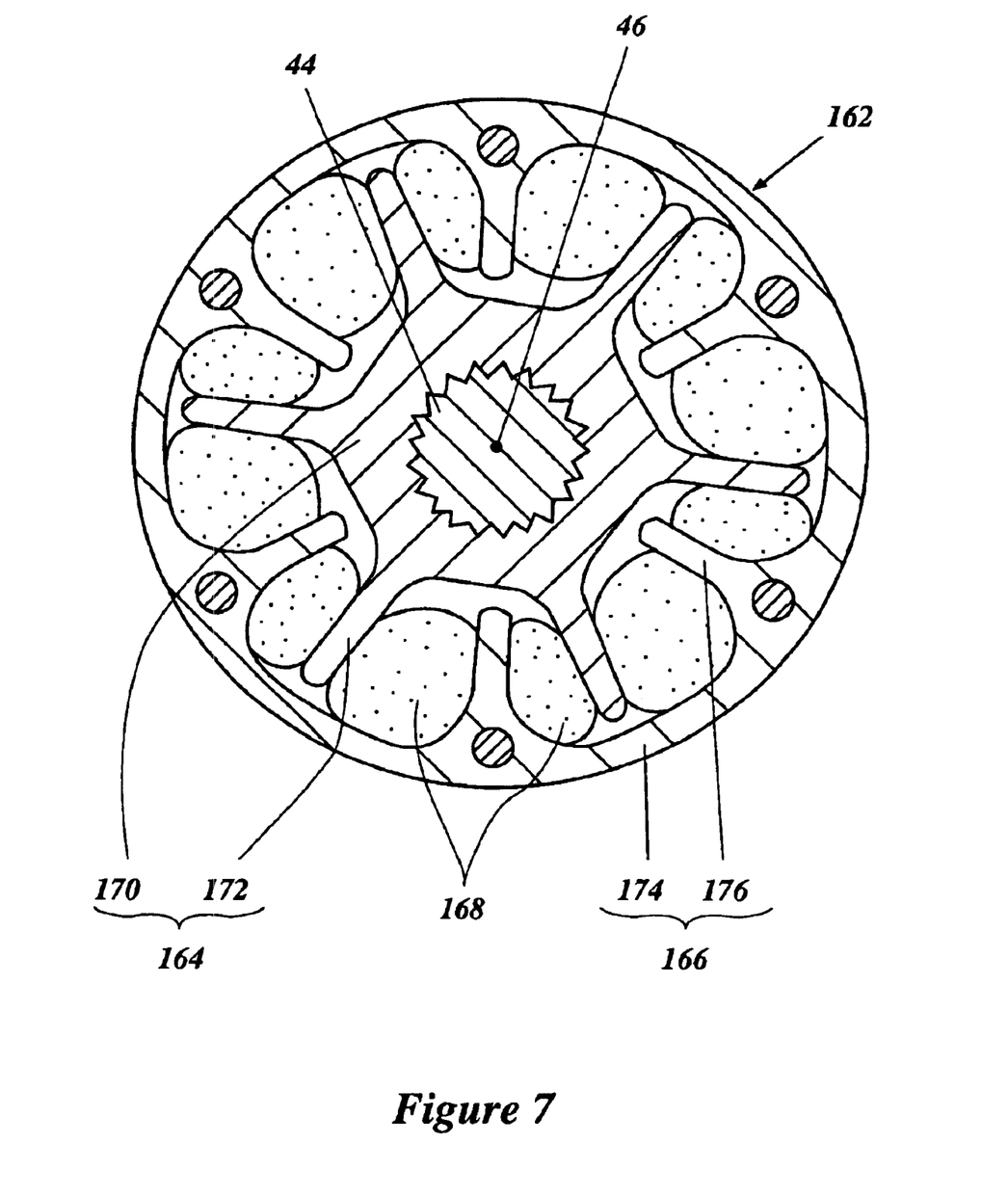
FIG. 7 is a cross-sectional view of the input shaft of FIG. 6, taken along view line 7—7 of FIG. 6.

Preferably, the input shaft 146 of the transmission assembly 36 is supported by the engine body 40 through a pair of bearing assemblies 158, 160 spaced from one another along an axis of the input shaft 146. The input shaft 146 is coupled to the crankshaft 44 of the engine 34 through a damper assembly 162, which is configured to attenuate vibrations produced by the engine 34 from being passed to the transmission 36 and, ultimately, the drive assembly 26.

In the illustrated embodiment, arrangement, the damper assembly 262 includes a drive side body 164 and a follower side body 166. A damper element 168 is interposed between the drive side body 164 and the follower side body 166.

The drive side body 164 includes a central portion, or hub 170 and a plurality of engagement members, or arms 172, extending radially outward from the hub 170. As illustrated, preferably the drive side body 164 is coupled for rotation with the crankshaft 44 through a splined connection.

The follower side body 166 includes an outer perimeter portion, or casing 174, which surrounds a periphery of the drive side body 164, and a plurality of projecting portions, or arms 176 that project radially inwardly from the casing 174 and into spaces defined between adjacent arms 172 of the drive side body 164.

The damper element 168 is positioned between each adjacent arms 172, 176 of the drive side body 164 and the follower side body 166, respectively. The damper element 168 can comprise a single element or, as illustrated, can comprise a plurality of individual elements 168 interposed between adjacent pairs of the arms 172, 176 of the drive side body 164 and follower side body 166, respectively.

With reference to FIG. 6, preferably the follower side body 166 surrounds both sides of the drive side body 164 in a direction along an axis of the input shaft 146. That is, preferably the follower side body 166 includes a first portion 166a and a second portion 166b coupled by one or more fastening members, such as a bolt 78. The first and second portions 166a, 166b cooperate to define a space therebetween, which is configured to accommodate the drive side body 164.

In the illustrated arrangement, the second portion 166b includes the arms 176 of the follower side body 166. However, in alternative arrangements, the arms 176 can be defined by either, or both, of the first and second portions 166a, 166b. In addition, preferably, the first portion 166a is supported by the first bearing assembly 158 and the second portion 166b is supported by the second bearing assembly 160.

Advantageously, the illustrated damper assembly 162 reduces engine vibrations that are transmitted to the transmission 36. In addition, by supporting the input shaft 146 relative to the engine body 40 with the spaced bearing assemblies 158, 160, greater support of the input shaft 146 is possible than in an arrangement wherein the input shaft is supported entirely outside of the engine body 40 on an exposed end of the crankshaft 44.

In operation of the snowmobile 10, the engine 34 is started by initially rotating the crankshaft 44, preferably with the start-up assembly 96. Atmospheric air 68 and fuel 70 are provided to the combustion chambers of the engine 34 through the intake system 64. The mixture of air 68 and fuel 70 is ignited within the combustion chamber by the sparkplug 56. Exhaust gases 80 are evacuated from the combustion chambers through the exhaust system 78. The torque produced by the engine 34 is transferred to the drive assembly 26 through the transmission assembly 36 and drive connection 38. In response, the drive belt 32 is rotated, which propels the snowmobile 10 along the ground surface S.

As described above, the snowmobile 10 incorporating a preferred embodiment of the component arrangement described above possesses desirable handling characteristics. For example, in the illustrated embodiment, the overall center of gravity of the snowmobile 10 is lowered and moved rearwardly relative to a center of gravity typical of prior art snowmobiles, especially snowmobiles incorporating 4-cycle engines. As a result, stability and traction of a snowmobile 10 incorporating a preferred embodiment of the present component arrangement are improved over the prior art. In addition, preferred embodiments of the present component arrangement provide necessary and desirable components within the space provided by a snowmobile body 12 having substantially conventional dimensions.

Although this invention has been disclosed in the context of a preferred embodiment, it will be understood by those skilled in the art that the present invention extends beyond the specifically disclosed embodiment to other alternative embodiments and/or uses of the invention and obvious modifications and equivalence thereof. In particular, while the present snowmobile component arrangement has been described in the context of a particularly preferred embodiment, the skilled artisan will appreciate, in view of the present disclosure, that certain advantages, features and aspects of the system can be realized in a variety of other applications, many of which have been noted above. Additionally, it is contemplated that various aspects and features of the invention described can be practiced separately, combined together, or substituted for one another, and that a variety of combinations and subcombinations of the features and aspects can be made and still fall within the scope of the invention. Thus, it is intended that the scope of the present invention herein disclosed should not be limited by the particular disclosed embodiment described above, but should be determined only by a fair reading of the claims.

What is claimed is:

1. A snowmobile comprising a frame assembly, a drive assembly coupled to the frame assembly and including a drive belt adapted to contact a ground surface to propel the snowmobile over the ground surface, an engine supported by the frame assembly, the engine including an engine body comprising a crankcase, a crankshaft rotatably journaled within the crankcase for rotation about a crankshaft axis, a cylinder block assembly extending in an upward direction from the crankcase, the cylinder block assembly defining at least one cylinder bore adapted to support a piston for reciprocal motion along a bore axis, and a balancer shaft rotatably coupled to the crankshaft and supported by the engine body for rotation about a balancer shaft axis, the cylinder assembly canted such that the bore axis is inclined rearwardly from a vertical axis, and the wherein balancer shaft axis is disposed above the crankshaft axis.

2. The snowmobile of claim 1, wherein the balancer shaft axis is forward of the crankshaft axis.

3. The snowmobile of claim 1, wherein the balancer shaft is rotatably supported by the cylinder assembly.

4. The snowmobile of claim 1, additionally comprising an air box defining a plenum chamber therein, the air box disposed on a forward side of the cylinder assembly.

5. The snowmobile of claim 4, wherein at least a portion of the air box is above the cylinder assembly.

6. The snowmobile of claim 1, additionally comprising a water pump adapted to deliver cooling liquid to the engine body, the water pump disposed above the crankshaft.

7. The snowmobile of claim 1, additionally comprising a battery disposed between the cylinder assembly and the air box.

8. The snowmobile of claim 7, wherein at least a portion of the battery is below the air box.

9. The snowmobile of claim 1, additionally comprising a lid member coupled to a lower end of the crankcase, the lid member and the crankcase cooperating to define a lubricant chamber therebetween, at least one lubricant pump disposed within the lubricant chamber and supported by the crankcase.

10. The snowmobile of claim 9, wherein the at least one lubricant pump comprises a first lubricant pump and a second lubricant pump, additionally comprising an internal wall within the lubricant chamber, an inlet of the first lubricant pump positioned a first side of the wall and an inlet of the second lubricant pump positioned on a second side of the wall.

11. The snowmobile of claim 1, additionally comprising a transmission assembly adapted to transmit torque produced by the engine to the drive assembly, the transmission including an input shaft supported by at least two bearing assemblies spaced along an axis of the input shaft, the at least two bearing assemblies supported by the engine body.

12. The snowmobile of claim 11, additionally comprising a damper operably positioned between the crankshaft and the input shaft.

13. A snowmobile comprising a frame assembly, a drive assembly coupled to the frame assembly and including a drive belt adapted to contact a ground surface to propel the snowmobile over the ground surface, an engine supported by the frame assembly, the engine including an engine body comprising a crankcase, a crankshaft rotatably journaled within the crankcase for rotation about a crankshaft axis, a cylinder block assembly extending in an upward direction from the crankcase, the cylinder block assembly defining at least one cylinder bore adapted to support a piston for reciprocal motion along a bore axis, and a balancer shaft rotatably coupled to the crankshaft and supported by the engine body for rotation about a balancer shaft axis, wherein the cylinder assembly canted such that the bore axis is inclined rearwardly from a vertical axis and at least a portion of the balancer shaft is disposed directly above the crankshaft.

14. The snowmobile of claim 13, wherein the balancer shaft axis is forward of the crankshaft axis.

15. The snowmobile of claim 13, wherein the balancer shaft is rotatably supported by the cylinder assembly.

16. The snowmobile of claim 13, additionally comprising an air box defining a plenum chamber therein, the air box disposed on a forward side of the cylinder assembly.

17. The snowmobile of claim 16, wherein at least a portion of the air box is above the cylinder assembly.

18. The snowmobile of claim 13, additionally comprising a water pump adapted to deliver cooling liquid to the engine body, the water pump disposed above the crankshaft.

19. The snowmobile of claim 13, additionally comprising a battery disposed between the cylinder assembly and the air box.

20. The snowmobile of claim 19, wherein at least a portion of the battery is below the air box.

21. The snowmobile of claim 13, additionally comprising a lid member coupled to a lower end of the crankcase, the lid member and the crankcase cooperating to define a lubricant chamber therebetween, at least one lubricant pump disposed within the lubricant chamber and supported by the crankcase.

22. The snowmobile of claim 21, wherein the at least one lubricant pump comprises a first lubricant pump and a second lubricant pump, additionally comprising an internal wall within the lubricant chamber, an inlet of the first lubricant pump positioned a first side of the wall and an inlet of the second lubricant pump positioned on a second side of the wall.

23. The snowmobile of claim 13, additionally comprising a transmission assembly adapted to transmit torque produced by the engine to the drive assembly, the transmission including an input shaft supported by at least two bearing assemblies spaced along an axis of the input shaft, the at least two bearing assemblies supported by the engine body.

24. The snowmobile of claim 23, additionally comprising a damper operably positioned between the crankshaft and the input shaft.

* * * * *

UNITED STATES PATENT AND TRADEMARK OFFICE
CERTIFICATE OF CORRECTION

PATENT NO. : 6,880,659 B2  
APPLICATION NO. : 10/648024  
DATED : April 19, 2005  
INVENTOR(S) : Yamamoto Page 1 of 1

It is certified that error appears in the above-identified patent and that said Letters Patent is hereby corrected as shown below:

At Column 9, line 49, in Claim 1, delete "the" before *wherein* and insert -- the -- after *wherein*.

At Column 10, line 34, in Claim 13, insert -- is -- before *canted*.

At Column 11, line 4, in Claim 23, insert -- assembly -- before *including*.

Signed and Sealed this

Thirteenth Day of May, 2008

JON W. DUDAS  
*Director of the United States Patent and Trademark Office*